Patented Jan. 5, 1932

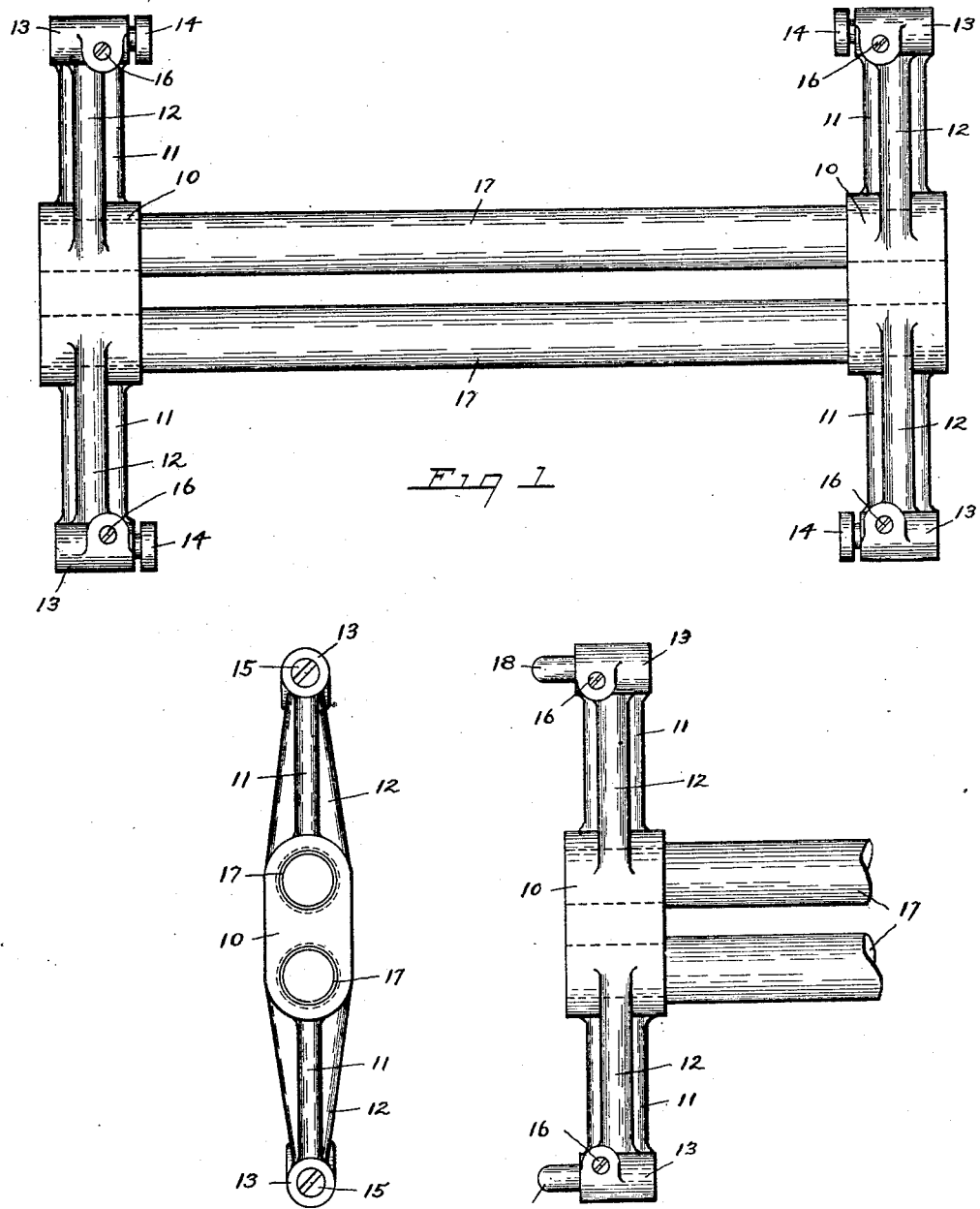

1,840,006

UNITED STATES PATENT OFFICE

ERIK H. ALDEBORGH, OF POUGHKEEPSIE, NEW YORK, ASSIGNOR TO STANDARD GAGE COMPANY, INC., OF POUGHKEEPSIE, NEW YORK, A CORPORATION OF NEW YORK

SHOULDER GAUGE

Application filed June 30, 1928. Serial No. 289,478.

This invention relates to a snap gauge of the shoulder type, which is employed in the checking of measurements of large diameters, where there is not sufficient space within which to use the regular style of snap gauge, or where the dimensions are too large for a snap gauge.

While there have been gauges made for this purpose, owing to their size and construction, they are not only hard to use, having no "feel", but are liable to have a spring or twist, which will cause them to vary several thousandths in large diameters.

The object of the invention is to construct a gauge of this class which shall be light and still rigid in construction, having no spring or twist, and being accurate in use.

Another object of the invention is to provide a gauge of few parts, and those parts so designed that by being reversed they can be used either as an external or internal gauge.

With these and other objects in view, my invention consists in certain construction and combination of parts as will hereinafter be fully described and claimed, and illustrated in the accompanying drawings in which like figures of reference refer to corresponding parts in all of the views, but it is understood that slight changes may be made without departing from the spirit of the invention.

In the drawings:—

Figure 1 is a side elevation of a gauge, embodying my invention.

Figure 2 is an end view of the same.

Figure 3 is a view of one of the heads, showing the same arranged for internal use.

Referring to the drawings:—

The instrument comprises the two heads 10, which are formed with the arms 11, of any desired shape in cross section, but here shown as having the ribs 12, making a light and very rigid construction.

Said arms 11, terminating in the bearing or clamping members 13, within which are secured in the usual manner the gauging contact plugs 14, which are held by the adjusting plugs 15 and the locking screws 16.

The heads 10, are formed with two parallel orifices within which are secured the ends of two tubular handles 17, which are shouldered and held in said orifices either by a force fit, or other suitable manner.

This form of construction produces a form of truss, making an instrument which is rigid, and in which the heads can not spring in any direction; and the tubular form of handle providing a light construction.

The form illustrated in Figures 1 and 2 shows the gauge as arranged for external measuring, but in Figure 3 there is shown an internal gauge, in which the head 10 is placed on the ends of the tubular handles 17 in a reversed manner, and the gauging contact plugs are in the form of rounded members 18, but it is to be understood that any desired form or construction of head and gauging member may be used.

It is to be understood that the heads and arms may be made of any suitable material such as steel castings, drop forgings, etc., and that the handle members may be of tubing or solid material and may be fitted with insulating hand sleeves or grips.

Having thus described my invention, what I claim as new and desire to secure by Letters Patent, is:

1. A precision gauge of the class described, comprising in combination with a pair of tubular handle members adjacent to and in parallel relation with each other, said handle members being reduced in diameter adjacent their ends, a pair of gauging heads formed with a boss and adapted to be rigidly secured to the ends of said handle members, arms forming a part of said gauging heads and at right angles to the handle members and parallel with each other, and adjustable gauging contacts mounted in the ends of said arms.

2. A precision snap gauge for large diameters, comprising in combination with a pair of solid heads formed with hubs and gauging arms having adjustable gauging contacts mounted thereon, said heads formed with parallel orifices in the hubs thereof and at right angles to said arms, a pair of tubular handle members having their ends rigidly secured in said orifices.

In testimony whereof I affix my signature.

ERIK H. ALDEBORGH.